(12) United States Patent
Onodera

(10) Patent No.: US 8,433,022 B2
(45) Date of Patent: Apr. 30, 2013

(54) CLOCK DATA RECOVERY CIRCUIT AND CLOCK DATA RECOVERY METHOD

(75) Inventor: Mitsuru Onodera, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 165 days.

(21) Appl. No.: 13/113,461

(22) Filed: May 23, 2011

(65) Prior Publication Data

US 2012/0039426 A1 Feb. 16, 2012

(30) Foreign Application Priority Data

Aug. 13, 2010 (JP) ................................. 2010-181323

(51) Int. Cl.
*H04L 7/00* (2006.01)

(52) U.S. Cl.
USPC .......... 375/355; 375/368; 375/375; 375/376; 327/147; 327/150; 327/159

(58) Field of Classification Search .................. 375/324, 375/327, 344, 354, 355, 362, 368, 371, 373, 375/375, 376; 327/141, 144–147, 150, 155, 327/156, 159, 162; 455/182.1, 182.2, 192.1, 455/192.2; 341/122, 124, 125, 126, 146
See application file for complete search history.

(56) References Cited

U.S. PATENT DOCUMENTS

| | | | | |
|---|---|---|---|---|
| 5,675,612 | A | * 10/1997 | Solve et al. | ............... 375/326 |
| 6,917,658 | B2 | * 7/2005 | Fernald | .................. 375/355 |
| 7,187,192 | B2 | 3/2007 | Oshima et al. | |
| 7,526,049 | B2 | 4/2009 | Kushiyama | |
| 2010/0316098 | A1 | * 12/2010 | Pals et al. | ................. 375/219 |

FOREIGN PATENT DOCUMENTS

| | | | |
|---|---|---|---|
| JP | 2003-315428 | A | 11/2003 |
| JP | 2006-339858 | A | 12/2006 |
| JP | 4006260 | B2 | 11/2007 |

* cited by examiner

*Primary Examiner* — Dac Ha
(74) *Attorney, Agent, or Firm* — Arent Fox LLP

(57) ABSTRACT

A clock data recovery circuit includes a receiving circuit that takes in input data based on a sampling clock, a demultiplexer that converts serial data output from the receiving circuit into parallel data, a clock/data recovery part that detects phase information from the parallel data output from the demultiplexer and generates the sampling clock by adjusting the phase of a reference clock based on the phase information, a data pattern analyzer that carries out frequency analysis of the parallel data output from the demultiplexer, and an aliasing detector that detects a clock recovery state based on the analysis result of the frequency of the parallel data.

19 Claims, 14 Drawing Sheets

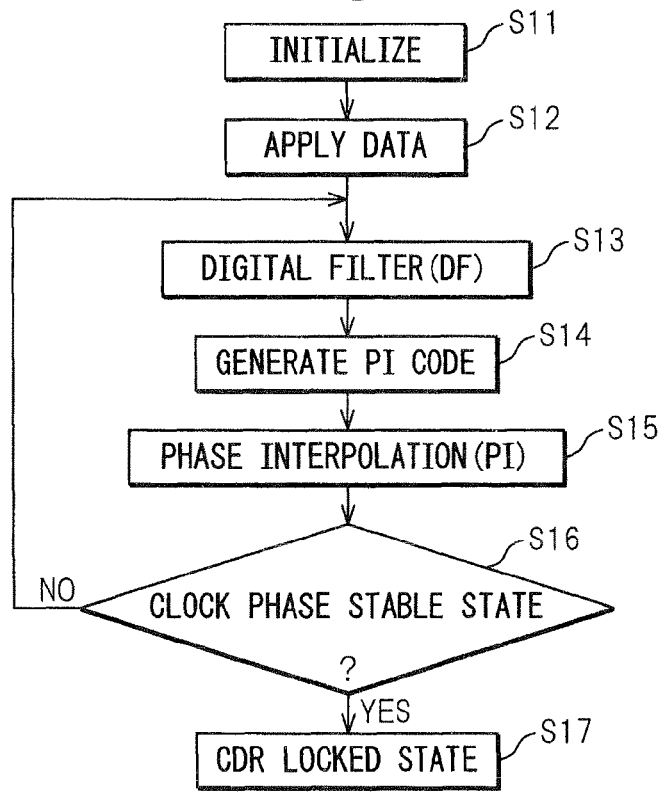
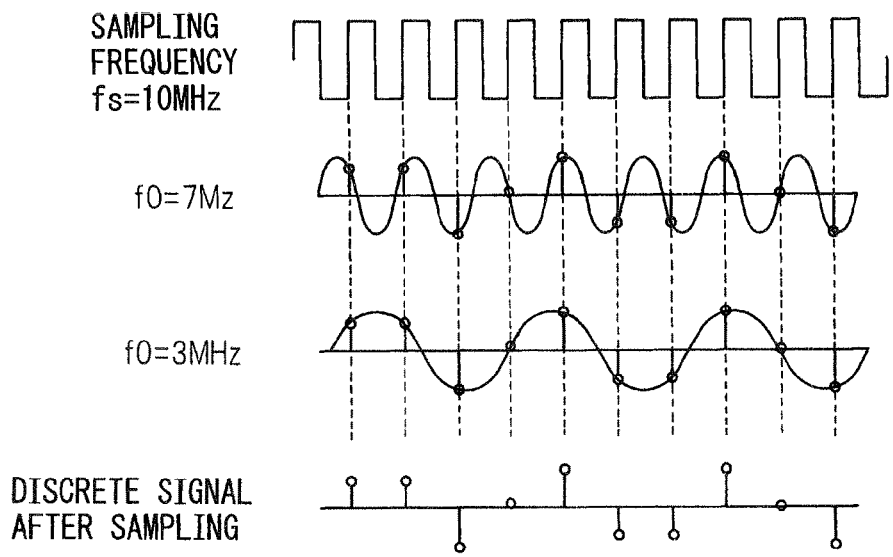

FIG.5

| RUN LENGTH | fs' [MHz] | f0[MHz] | | | |
|---|---|---|---|---|---|
| | | 100 | 20 | 10 | 2 |
| 1 | 337.00 | 3.37 | 16.85 | 33.70 | 168.50 |
| 2 | 168.50 | 1.69 | 8.43 | 16.85 | 84.25 |
| 4 | 84.25 | 0.84 | 4.21 | 8.43 | 42.13 |
| 8 | 42.13 | 0.42 | 2.11 | 4.21 | 21.06 |
| 16 | 21.06 | 0.21 | 1.05 | 2.11 | 10.53 |
| 32 | 10.53 | 0.11 | 0.53 | 1.05 | 5.27 |
| 64 | 5.27 | 0.05 | 0.26 | 0.53 | 2.63 |
| 72 | 4.68 | 0.05 | 0.23 | 0.47 | 2.34 |

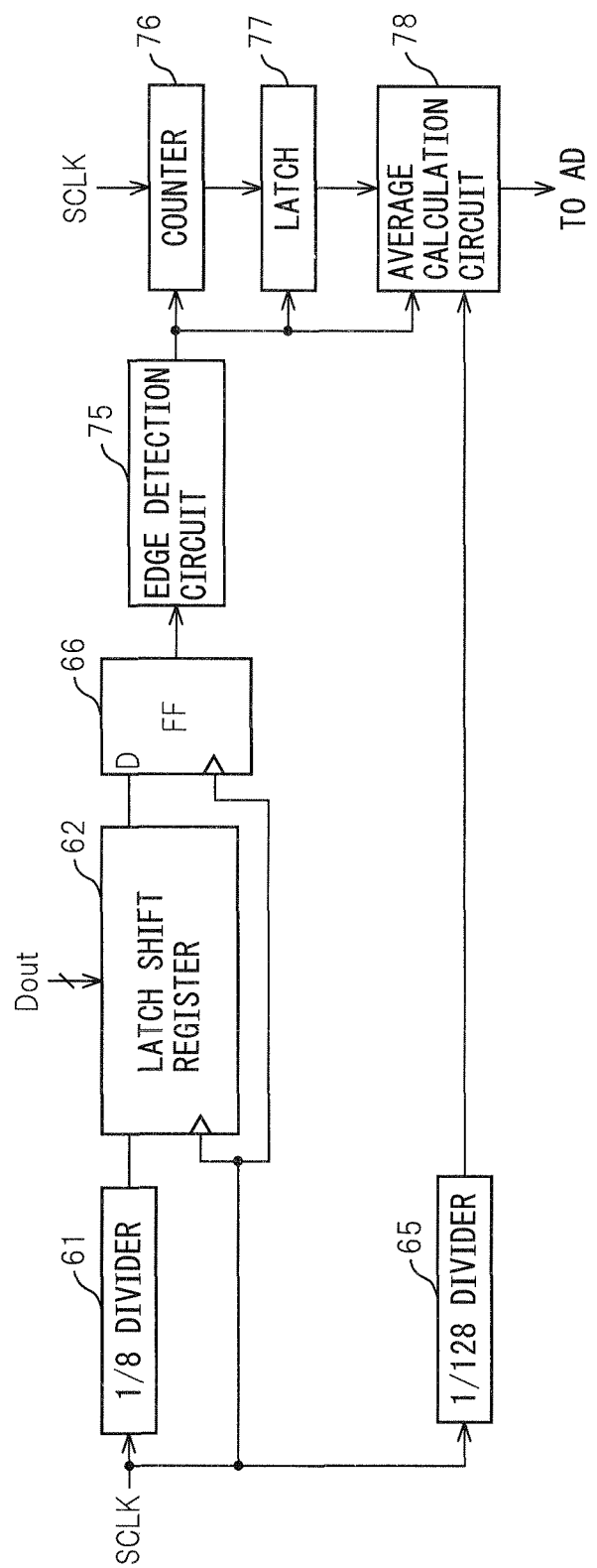

CLOCK DATA RECOVERY CIRCUIT AND CLOCK DATA RECOVERY METHOD

CROSS-REFERENCE TO RELATED APPLICATIONS

This application is based upon and claims the benefit of priority of the prior Japanese Patent Application No. 2010-181323, filed on Aug. 13, 2010, the entire contents of which are incorporated herein by reference.

FIELD

The embodiments discussed herein are related to a clock data recovery circuit and clock data recovery method for recovering a clock from input data.

BACKGROUND

On an NRZ (Non-Return-Zero) signal, a clock is superposed. A SerDes (Serial/Deserializer) circuit extracts data from the input data of the received NRZ signal.

FIG. 1A is a diagram illustrating a fundamental configuration of the SerDes circuit that receives the NRZ signal transmitted from a transmitter. As illustrated in FIG. 1A, the SerDes circuit has a SerDes block 10 and a clock generation block 20. The clock generation block 20 has a PLL circuit 21 that receives a reference clock CLK (27 MHz) and generates a multiplication clock RCLK having a frequency of 2.7 GHz, 100 times 27 MHz.

The SerDes block circuit 10 has a receiving circuit 11, a ⅛ divider 12, and a 1:8 demultiplexer (Demux) 13. The receiving circuit 11 receives input data Din (2.7 Gbps) with RCLK as a sampling clock and outputs a serial data signal. The ⅛ divider 12 divides RCLK into eight parts and outputs a divided clock (337 MHz). The 1:8 Demux 13 converts the serial data signal into 8-bit parallel data based on RCLK and the divided clock and outputs it as output data Dout.

In the SerDes circuit in FIG. 1A, when the receiving circuit 11 takes in input data in synchronization with the rising edge of RCLK, it is desirable for the rising edge of RCLK to be shifted 180 degrees (½ period of the clock) with respect to the change edge of the input data Din. To correct the reception, it is necessary for RCLK to be in a predetermined phase range with respect to this ideal phase.

In the SerDes circuit in FIG. 1A, a clock source on the transmission side that transmits the input data Din and a reference clock source on the reception side that generates CLK are not synchronized, and therefore, it is not possible to receive transmitted data correctly.

Because of this, in the SerDes circuit, data and a clock are separated from the input data Din and the phase of the multiplication clock RCLK applied to the receiving circuit as a sampling clock is adjusted based on the separated clock. The function of recovering a clock from input data is referred to as a CDR (Clock & Data Recovery) function.

FIG. 1B is a diagram illustrating a configuration of the SerDes circuit having the CDR function. As illustrated in FIG. 1B, the SerDes circuit having the CDR function has the SerDes block 10, the clock generation block 20, and a CDR (Clock & Data Recovery) block 30. The SerDes block 10 and the clock generation block 20 are the same as those in FIG. 1A, however, different in that the Demux 13 of the SerDes block 10 outputs an output clock (337 MHz) and takes in input data at SCLKB 180 degrees different in phase from SCLK, to be described later, and outputs it as Bout.

The CDR block 30 detects phase information of the output data Dout and adjusts the phase of the multiplication clock RCLK. As illustrated in FIG. 1B, the CDR block 30 has a digital filter (DF) 31, a PI code generator 32, and a phase interpolator (PI) 33. The DF 31 compares the phase of the change timing of Dout and Bout output from the Demux 13 with the phase of the sampling clock SCLK output from the PI 33 and outputs a phase differential signal, from which the harmonic component is removed through a low pass filter (LPF). LPF is realized by an integral circuit that integrates the result of determination of whether Dout and Bout are advanced or delayed with respect to SCLK by a phase comparator and which substantially performs low pass filtering. The PI code generator 32 generates a PI code to be output to the phase interpolator 33 based on the phase difference signal output from the DF 31. The phase interpolator 33 adjusts the phase of RCLK based on the PI code and outputs the sampling clock SCLK and SCLKB 180 degrees different in phase from SCLK. SCLK and SCLKB are adjusted so as to be in a predetermined phase range with respect to the ideal phase in the receiving circuit 11, as a result.

The SerDes circuit having the CDR function illustrated in FIG. 1B changes the phase of SCLK so as to be in a predetermined phase range with respect to the ideal phase, and therefore, it is possible to correctly receive the input data Din.

As described above, the SerDes circuit having the CDR function is a circuit to recover input data, however, from the viewpoint of the CDR function, it is a circuit for recovering a clock included in input data, and therefore, in some cases, it is referred to as a CDR circuit, and here it also is referred to as a CDR circuit.

FIG. 2 is a flowchart illustrating the functional operation of the SerDes circuit (CDR circuit) having the CDR function.

In step S11, analog blocks, such as the receiving circuit 11, the PI 33, and the PLL 21, are initialized in addition to the blocks, such as the Demux 13, the DF 31, and the PI code generator 21, that perform digital processing.

In step S12, the input data Din is applied.

In step S13, the digital filter (DF) 31 generates a phase difference signal.

In step S14, the PI code generator 32 generates a PI code.

In step S15, the phase interpolator 33 adjusts the phase of RCLK based on the PI code and generates SCLK.

In step S16, whether the phase of SCLK becomes stable and enters a predetermined phase range with respect to the ideal phase is determined and when the state is not stable, the procedure returns to step S13 and when stable, to step S17.

In step S17, that the CDR block 30 becomes stable and the clock phase adjustment is in the locked state is notified to outside.

The CDR circuit is widely known, and therefore, more explanation is omitted.

As described above, the digital filter (DF) 31 generates a phase difference signal from a change edge of recovered data output from the SerDes block. The change edge of the recovered data is determined by a data pattern of input data. Because of this, the data pattern of input data affects the phase difference signal. Specifically, when the input data changes frequently, the change edge occurs frequently in the recovered data, and therefore, the phase difference signal occurs frequently. In contrast to this, when the same data continues in the input data, the frequency of occurrence of change edge is reduced and no phase difference signal occurs for a long period of time, and therefore, a state will continue where in which phase the phase of the sampling clock SCLk is with respect to the ideal phase may not be determined. Because of this, even if there is a very small phase difference between the sampling clock and the clock of the input data, the phase shift is not adjusted but increases gradually and the phase of the sampling clock may extend beyond the predetermined phase range with respect to the ideal phase, i.e., a case in which an unlocked state is brought about. Further, if the phase shift becomes equal to or greater than one period of the clock, an overcycle in which correct data may not be received, i.e., data loss occurs.

It is known that when sampling an analog signal by a sampling signal, if a frequency higher than half the frequency of the sampling signal is included in the analog signal, correct information about the frequency component of the original analog signal may not be obtained. This is referred to as aliasing.

The above-mentioned state where the input data continues to be the same data for a long period of time corresponds to a state where the frequency of occurrence of the change edge is reduced and the frequency of the sampling signal is reduced, i.e., a state where information about the high-frequency clock included in the input data may not be obtained. This state is referred to as an aliasing state.

The SerDes circuit (CDR circuit) having the CDR function used to operate so as to automatically enter the locked state when input data is input and operate as in the locked state even when actually in the aliasing state. Because of this, the SerDes circuit having the CDR circuit used to output erroneous output data even when an overcycle occurs and data may not be received correctly. Erroneous output data adversely affects subsequent processing and reduces the reliability of the Ser-Des circuit.

SUMMARY

According to a first aspect of the embodiments, a clock data recovery circuit includes a receiving circuit that takes in input data based on a sampling clock, a demultiplexer that converts serial data output from the receiving circuit into parallel data, a clock/data recovery part that detects phase information from the parallel data output from the demultiplexer and generates the sampling clock by adjusting the phase of a reference clock based on the phase information, a data pattern analyzer that carries out a frequency analysis of the parallel data output from the demultiplexer, and an aliasing detector that detects a clock recovery state based on the analysis result of the frequency of the parallel data.

The object and advantages of the embodiments will be realized and attained by means of the elements and combination particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a flowchart illustrating a functional operation of the SerDes circuit having the CDR function.

FIG. 3 is a diagram explaining aliasing.

FIG. 5 is a diagram illustrating a relationship of a ratio between a substantial frequency fs' of a sampling signal and a jitter frequency f0 for a run length RL.

FIG. 11 is a diagram illustrating another circuit configuration of a data pattern analyzer (DPA).

EMBODIMENTS

Before explaining embodiments, a data pattern necessary for recovering a sampling clock SCLK from input data is explained.

When a frequency higher than half the frequency of a sampling signal is included in an analog signal, it is not possible to correctly sample information regarding the frequency component of the original analog signal. As described above, this is referred to as aliasing.

FIG. 3 is a diagram explaining aliasing. As illustrated in FIG. 3, when a sinusoidal wave having a frequency f0 of 7 MHz and a sinusoidal wave having a frequency f0 of 3 MHz are sampled by a sampling signal having a sampling frequency fs=10 MHz, the sampled discrete signals become the same and may not be distinguished from each other.

As to the frequency of a sampling signal, the sampling principles are known. When sampling a signal the frequency band of which is limited to 0 to f0, in order to obtain discrete signals holding a frequency component, the sampling interval (period) needs to meet the following conditions.

$$T1 \leq 1/(2f0)$$

The inverse of T is the sampling frequency fs, and therefore, the following expression needs to be met $$fs \leq 2f0.$$

A CDR circuit is a circuit to extract a clock superposed on data. A clock may be obtained by extracting information about the data phase by sampling the data and combining the sampling signal (clock) in the CDR circuit into the extracted data phase. The data phase is a phase difference between the change edge of the data and the sampling signal (sampling clock) and this difference is called jitter.

Note that the signal to be sampled is not an analog signal but a digital data signal.

Figure 4A:
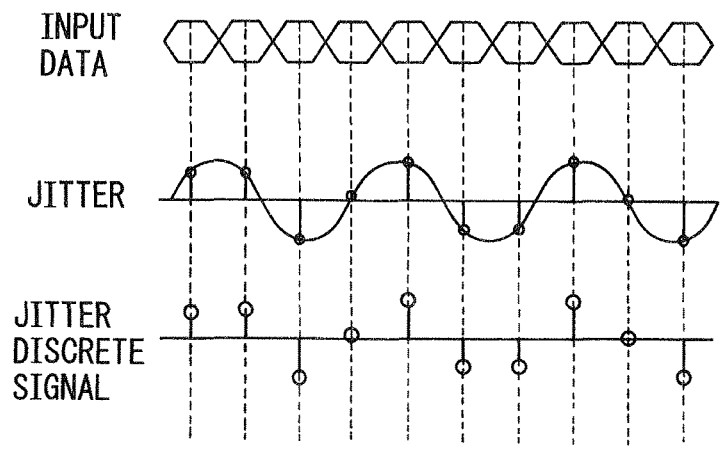
FIG. 4A to FIG. 4C are diagrams illustrating an example of a sampled jitter discrete signal when digital input data is sampled and there exists jitter that changes in the form of a sinusoidal wave with a period twice or more the period of a sampling clock.
Figure 4B:
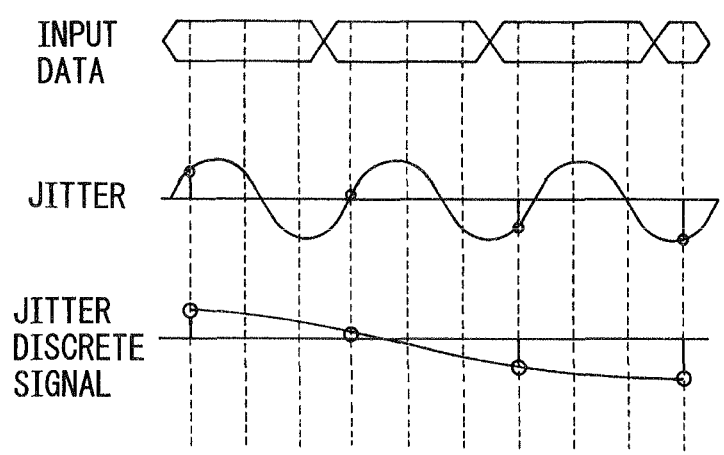
Figure 4C:
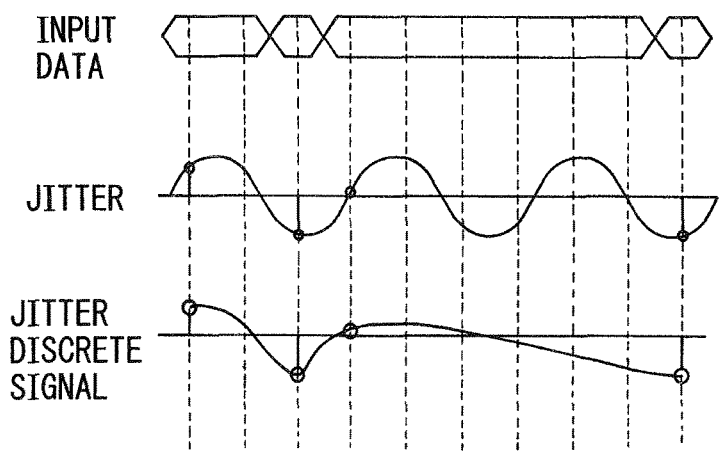

FIG. 4A to FIG. 4C are diagrams illustrating examples of sampled jitter discrete signals when digital input data is sampled and there exists jitter that changes in the form of a sinusoidal wave with a period twice or more the period of a sampling clock.

FIG. 4A illustrates an example when the data change rate at which input data changes for each clock is 100%. In this case, the sampled jitter discrete signal changes as illustrated schematically and sampling may be carried out normally.

FIG. 4B illustrates an example when the change rate at which data changes after the same data continues for three clocks, such as that 1110001110..., is 40%. In this case, the jitter changes at a period about 3.5 times the sampling clock, however, it seems that the jitter discrete signal may change at a period of about nine times the sampling clock.

FIG. 4C illustrates a case where data changes in such a manner that 1101111110..., an example when the data change rate is 40%. In this case, it is not possible to reproduce jitter from the jitter discrete signal. In this case, it seems that the frequency fs of the sampling signal may be modulated.

As explained in FIG. 4A to FIG. 4C, even if the jitter is the same, the jitter discrete signal differs depending on the pattern of data and this fact affects the reproduction of the jitter.

As an example of the CDR circuit, a SerDes circuit having such a CDR function as follows is considered.

SerDes processing:1:8 Demux
Input data rate:2.7 Gbps
Parallelization frequency:337 MHz
Jitter frequency:2 MHz/10 MHz/20 MHz/100 MHz The length during which the same data continues in the input data is called a run length RL and RL of data to be applied to the CDR circuit may be supposed to be 1, 2, 4, 8, 16, 32, 64, and 72 depending on its use.

As described above, depending on the pattern of input data to be input to the CDR circuit, the frequency fs of the sampling signal may be divided or modulated.

In the case of FIG. 4A, in the pattern of 01010101, the sampling frequency fs seems to remain as fs.

In the case of FIG. 4C, in the pattern of 000111000111, the sampling frequency fs seems to be fs/3.

Similarly, in the case of the pattern of 00110011, fs seems to be fs/2 and in the case of the pattern of 00001111, fs seems to be fs/4.

As described above, when data has a pattern regularly divided, fs also seems to be one divided.

In contrast to this, when data changes randomly, fs seems to be modulated.

Consequently, it is possible to determine whether or not aliasing has occurred by analyzing the pattern of input data.

Specifically, for the pattern having the run length RL of 1, 2, 4, 8, 16, 32, 64, 72, the substantial fs' of the sampling signal having a frequency fs=337 MHz seems to be 337 MHz, 168 MHz, 84 MHz, 42 MHz, 21 MHz, 10 MHz, 5.26 MHz, and 4.68 MHz. When the ratio between the substantial frequency fs' and the jitter frequency f0 of 100 MHz, 20 MHz, 10 MHz, and 2 MHz is calculated, the results will be as those illustrated in FIG. 5.

From the sampling principles, when the above-described ratio is 2 or less, the possibility that an aliasing state is brought about may be high. When the ratio is in a range between 2 and 8, unless the data pattern has a certain degree of regularity, the possibility that the aliasing state is brought about may be thought. When the ratio is 8 or more, even when the data pattern has regularity or is random, the jitter may be restored from the jitter discrete signal.

Because of the above, in the embodiment, when the ratio between the substantial frequency fs' and the frequency f0 of the jitter is 8 or more, the state is determined to be the non-aliasing state and when the ratio is 2 or less, the state is determined to be the aliasing state. When the ratio is between 2 and 8, whether the data pattern has regularity is determined further and when it has regularity, the state is determined to be the non-aliasing state and when not, determined to be the aliasing state. When the state is determined to be the aliasing state, information to the effect that there is a possibility of the aliasing state is output and at the same time, processing to improve followability of the CDR circuit is performed.

Figure 6:
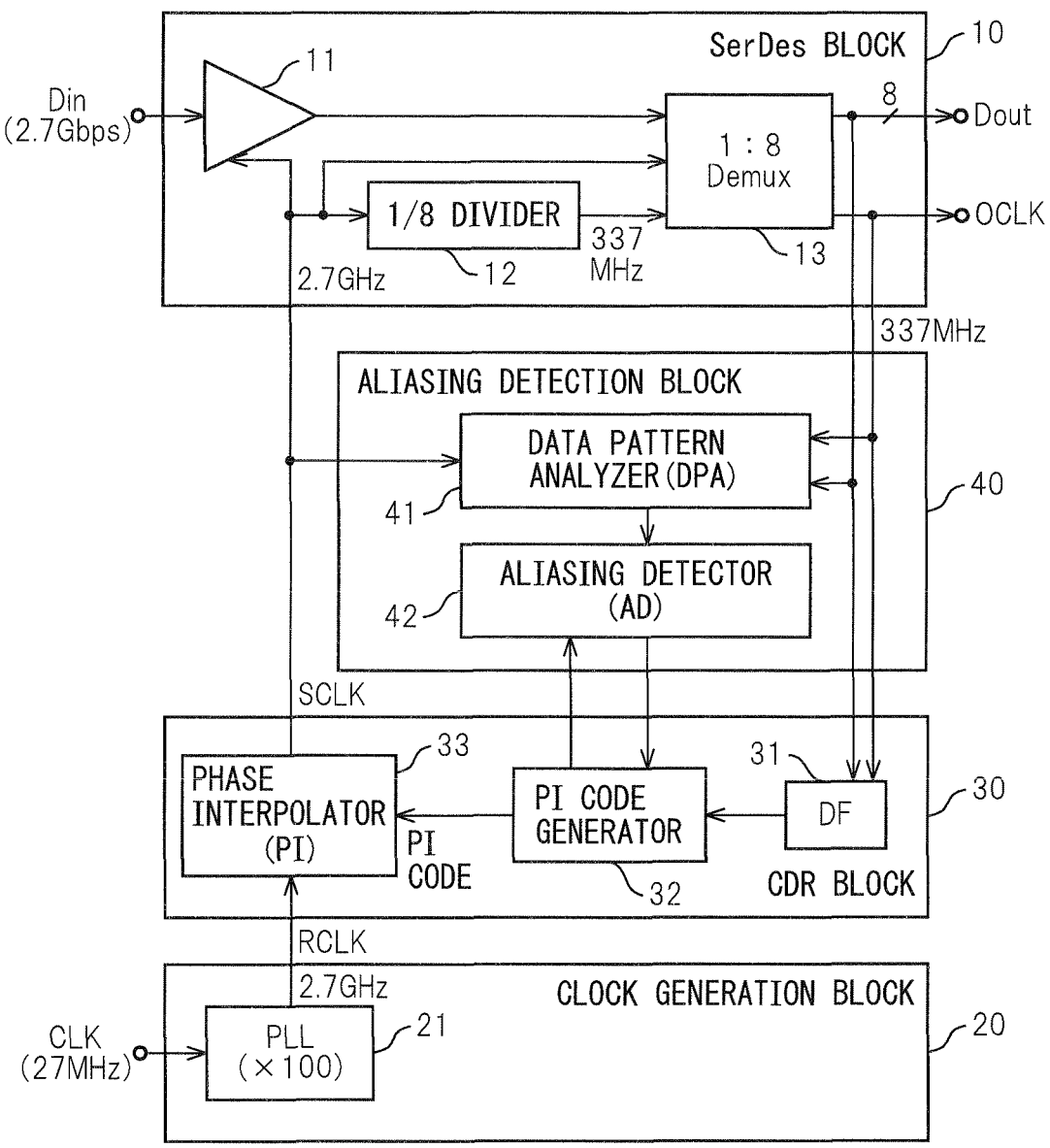
FIG. 6 is a diagram illustrating a configuration of a SerDes circuit (CDR circuit) having a CDR function in an embodiment.

FIG. 6 is a diagram illustrating a configuration of the SerDes circuit (CDR circuit) having the CDR function in the embodiment.

As illustrated in FIG. 6, the CDR circuit in the embodiment has a SerDes block 10, a clock generation block 20, a CDR (Clock & Data Recovery) block 30, and an aliasing detection block 40.

The clock generation block 20 has a PLL circuit 21 that receives a reference clock CLK and generates a multiplication clock RCLK multiplied by 100.

The SerDes block 10 has a receiving circuit 11, a ⅛ divider 12, and a 1:8 demultiplexer (Demux) 13. The receiving circuit 11 receives input data Din according to RCLK and outputs a serial data signal. The ⅛ divider 12 divides RCLK into eight parts and outputs a divided clock. The Demux 13 converts a serial data signal into 8-bit parallel data based on RCLK and the divided clock and outputs it as output data Dout and at the same time, outputs an output clock OCLK corresponding to the divided clock.

A case where the clock that generates the input data Din on the side of transmission is 2.7 GHz is explained as an example. Consequently, the reference clock CLK is a signal of 27 MHz, the multiplication clock RCLK is a signal of 2.7 MHz, and the divided clock is a signal of 337 MHz. However, the clock that generates the input data Din, the reference clock CLK, the multiplication factor, the division ratio, and the number of bits of the parallel data are not limited to those but should be determined according to the device.

The CDR block 30 has a digital filter (DF) 31, a PI code generator 32, and a phase interpolator (PI) 33. The DF 31 compares the phase of the change timing of Dout output from the Demux 13 with the phase of the sampling clock SCLK output from the PI 33 and generates a jitter signal indicative of a phase shift. By removing the harmonic component of the jitter signal through a low pass filter (LPF), a phase difference signal is generated. The PI code generator 32 generates a PI code to be output to the phase interpolator 33 based on the phase difference signal output from the DF 31. The phase interpolator 33 changes the phase of RCLK based on the PI code so as to be an ideal phase in the receiving circuit 11.

The aliasing detection block 40 has a data pattern analyzer (DPA) 41 and an aliasing detector (AD) 42. The data pattern analyzer 41 analyzes the data pattern of the data Dout output from the Demux 13 and outputs the result of the analysis to the aliasing detector 42. The aliasing detector 42 determines whether the state is the aliasing state or the non-aliasing state based on the analysis result. In FIG. 6, the aliasing detector 42 outputs the determination result to the PI code generator 32. The processing in the data pattern analyzer 41 and the aliasing detector 42 is described later.

Figure 7:
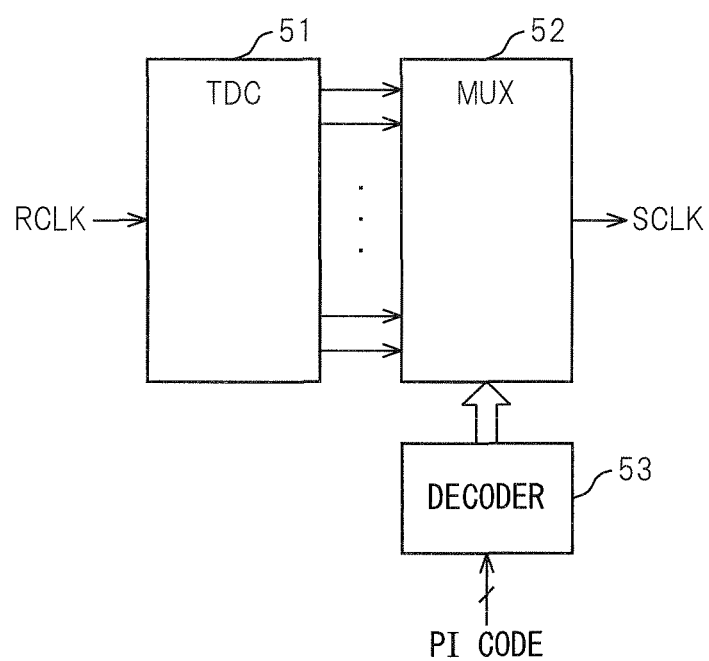
FIG. 7 is a diagram illustrating a circuit configuration of a phase interpolator.

FIG. 7 is a diagram illustrating a circuit configuration of the phase interpolator 33.

The phase interpolator 33 has a time digital converter (TDC) circuit 51, a multiplexer (MUX) 52, and a decoder 53. The TDC 51 receives the multiplication clock RCLK and outputs a phase shift signal, which is obtained by dividing the period of RCLK into $2^n$ parts. For example, when n=2, the TDC 51 generates four signals the phases of which are shifted by 0°, 90°, 180°, and 270° with respect to RCLK and when n=3, generates eight signals the phases of which are shifted by 0°, 45°, 90°, 135°, 180°, 225°, 270°, and 315°. In the embodiment, it is assumed that n=4. The MUX 52 selects and outputs one of the phase shift signals output from the TDC circuit. The decoder 53 decodes the PI code and outputs a select signal to specify a phase shift signal to be selected by the MUX 52.

Figure 1A:
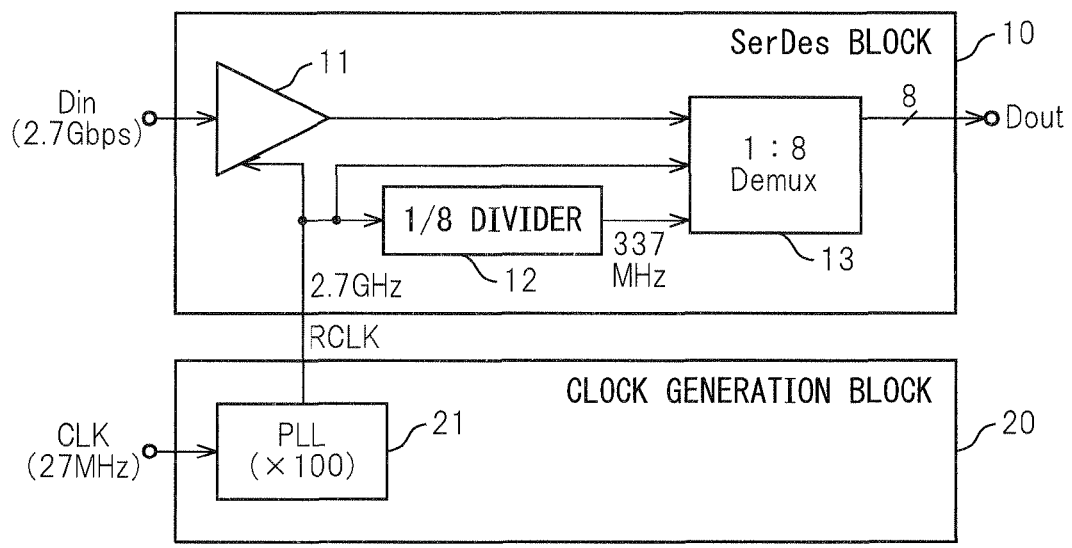
FIG. 1A and FIG. 1B are diagrams illustrating a fundamental configuration of a SerDes circuit (CDR circuit) having a CDR function to receive an NRZ signal transmitted from the side of transmission.
Figure 1B:
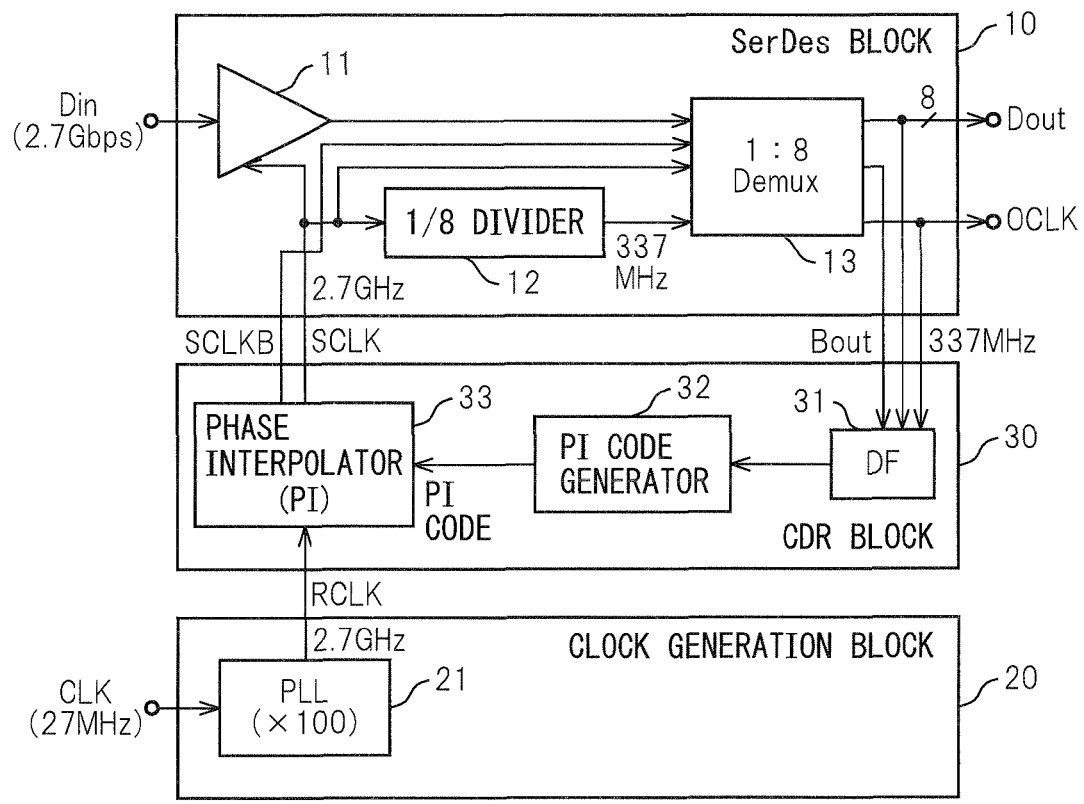
Figure 8:
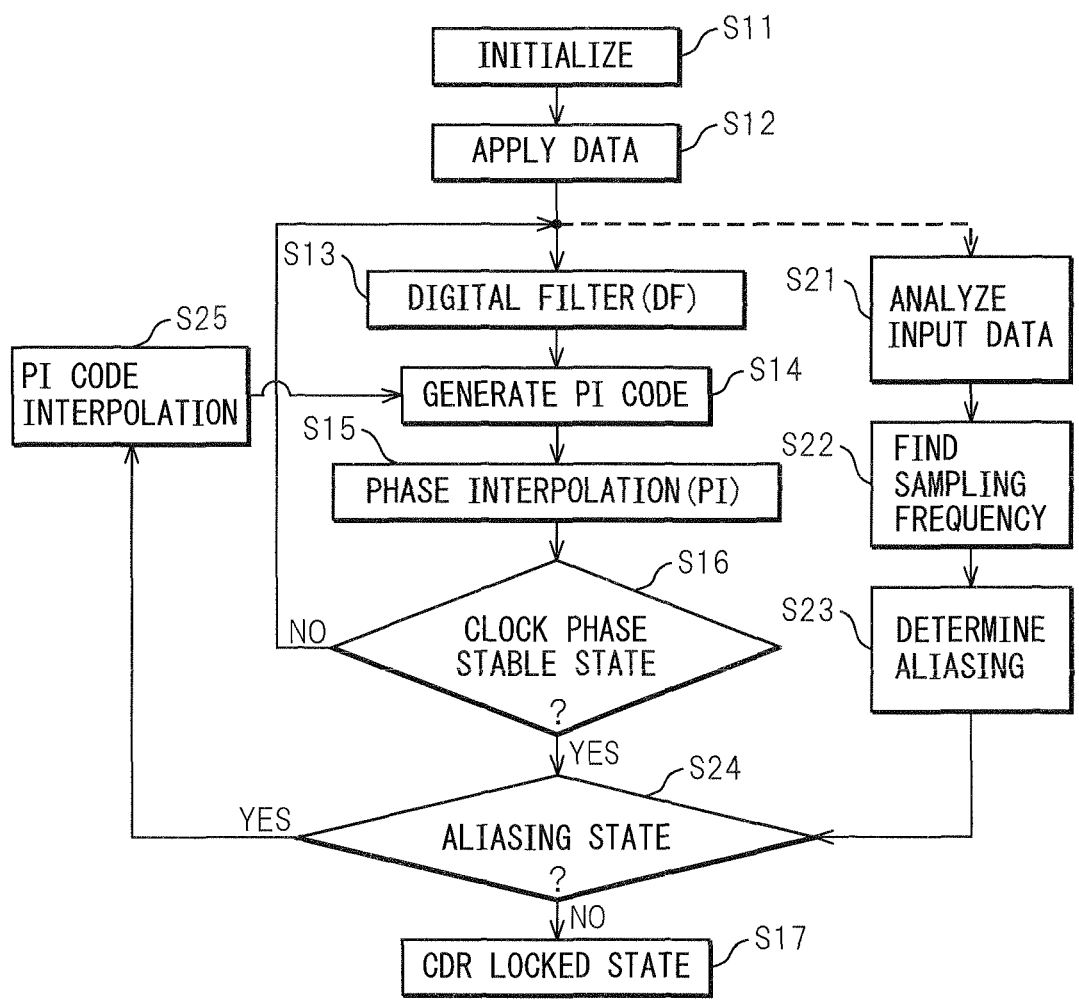
FIG. 8 is a flowchart illustrating a functional operation of a CDR circuit in an embodiment.

FIG. 8 is a flowchart illustrating a functional operation of the CDR circuit in the embodiment. In steps S11 to S16, substantially the same processing as the functional operation of the general SerDes circuit illustrated in FIG. 1 is performed.

In step S11, initialization of the analog blocks, such as the receiving circuit 11, the PI 33, and the PLL 21, is carried out besides the blocks in which digital processing is performed, such as the Demux 13, the DF 31, the PI code generator 32, the DPA 41, and the AD 42.

In step S12, the input data Din is applied. The data rate of the input data is 2.7 Gbps. The PI 33 outputs the sampling clock SCLK in the phase determined based on the PI code from the PI code generator 32. SCLK from the PI 33 is supplied to the receiving circuit 11 and the receiving circuit 11 takes in the input data Din based on SCLK. Consequently, in this stage, whether the phase of SCLK is fitted to the phase of the data is unknown.

The Demux 13 generates the 8-bit output data Dout by subjecting the input data taken in by the receiving circuit 11 to 1:8 serial-parallel conversion with SCLK and a divided clock, which is SCLK divided into eight parts. In this stage, whether the phase of SCLK is fitted to the phase of the data is unknown, and therefore, there is a possibility that data loss, etc., may have occurred in the output data Dout.

In step S13, the output data Dout is supplied to the digital filter (DF) 31. The DF 31 compares the phase of the change timing of Dout with the phase of the sampling clock SCLK output from the PI 33, generates a jitter signal indicative of a phase shift, and generates a phase difference signal by causing the jitter signal through a low pass filter (LPF) to remove the harmonic component.

Figure 9A:
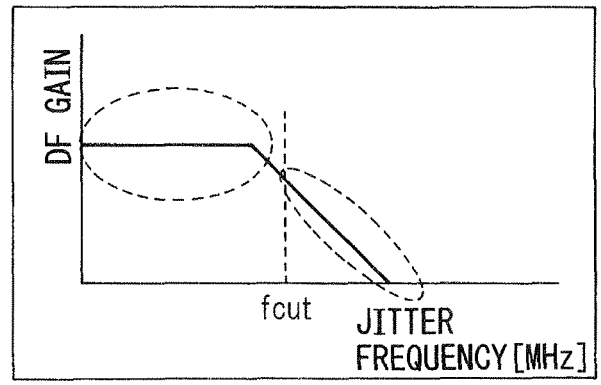
FIG. 9A to FIG. 9C are diagrams explaining processing of a jitter signal.
Figure 9B:
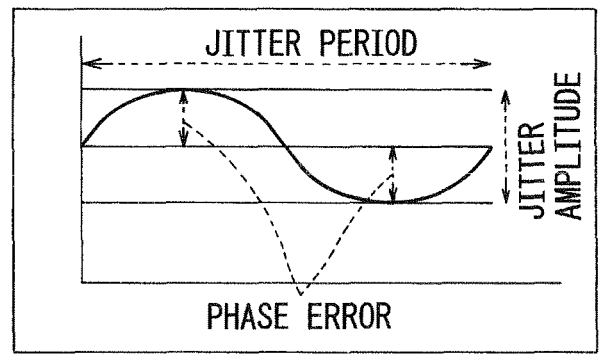
Figure 9C:
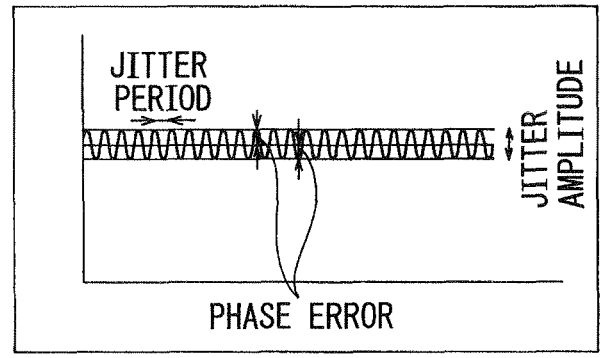

FIG. 9A to FIG. 9C are diagrams explaining processing of a jitter signal.

FIG. 9A is a diagram illustrating the characteristics of a low pass filter (LPF) of the DF 31. The low frequency component of a jitter signal, the jitter frequency of which is lower than fcut, is amplified with a high DF gain. On the other hand, the high frequency component of a jitter signal, the jitter frequency of which is higher than fcut, is amplified with a smaller DF gain for a higher frequency, and therefore, it is attenuated. In this manner, the jitter signal is limited in band by LPF.

FIG. 9B is a diagram illustrating an example of a change in the low frequency component of a jitter signal. The jitter signal changes in the shape of a sinusoidal wave with a jitter period and a jitter amplitude corresponding to the period difference between the clock of input data and SCLK.

FIG. 9C is a diagram illustrating a change in the high frequency component of a jitter signal. The high frequency component of a jitter signal is handled as a constant phase error.

In step S14, the PI code generator 32 calculates an amount of phase correction based on the phase difference signal and generates a PI code corresponding to the amount of phase correction.

In step S15, the phase interpolator 33 adjusts the phase of RCLK based on the PI code.

In step S16, whether the phase of RCLK enters a predetermined phase range with respect to the ideal phase, i.e., whether the clock phase stable state is entered is determined and when not entered, the procedure returns to step S13 and when entered, the procedure proceeds to step S24.

By repeating steps S11 to S16, the state becomes stable where the phase of RCLK enters a predetermined phase range with respect to the ideal phase. In other words, a state is brought about where only the constant phase error occurs. This state is the locked state of the CDR circuit hitherto, however, depending on the pattern of input data, the aliasing state is brought about and data loss, etc., may occur. Because of this, in the embodiment, steps S21 to S25 are performed in parallel with steps S13 to S16.

In step S21, the DPA 41 analyzes input data. In actuality, the data pattern of the output data Dout output from the Demux 13 is analyzed. The analysis processing will be described later. The analysis result includes information corresponding to the run length of the input data.

In step S22, the DPA 41 finds a band of the jitter frequency f0 from the phase difference signal found in step S13. Specifically, as explained in the processing in step S13, the PI code corresponds to the amount of phase correction, and therefore, the DPA 41 finds the band of the jitter frequency f0 from the PI code.

Then, the DPA 41 calculates the sampling frequency fs from the analysis result including the run length information and the band of the jitter frequency f0.

In step S23, the AD 42 determines whether there is a possibility that the aliasing state is entered with the calculated sampling frequency fs and when there is a possibility that the aliasing state is entered, a flag indicative of the aliasing state is set.

In step S24, after the state is determined to be the phase stable state in step S16, whether the state is the aliasing state is determined further and when the state is the non-aliasing state, the procedure proceeds to step S17 and when the state is the aliasing state, the procedure proceeds to step S25.

In step S17, the AD 42 determines that the CDR operation is in the locked state.

In step S25, the PI code generator 32 adjusts the PI code so as to bring about the non-aliasing state. When the PI code is adjusted, the sampling clock SCLK changes and steps S13 to S17 and steps S21 to S25 are repeated again.

The adjustment of the PI code is, for example, processing to increase the gain of the PI code. In the aliasing state, the number of samples is smaller than a necessary number. Therefore, it may be thought that with the amount of phase correction which is determined on the supposition that a number of samples is sufficient the CDR operation may not follow the change in phase of the clock of input data. Therefore, in order to avoid such a situation, the amount of phase correction by one-time feedback of the PI code is increased. Further, with another adjustment method of PI code, the resolution of the feedback control of the CDR operation is improved. Specifically, the resolution of the phase shift in the PI 33 is improved which is described later.

Next, analysis processing in the data pattern analyzer (DPA) 41 is explained. As explained with reference to FIG. 3 to FIG. 5, the DPA 41 determines whether the pattern of the input data has regularity and calculates its run length when it has regularity.

Figure 10:
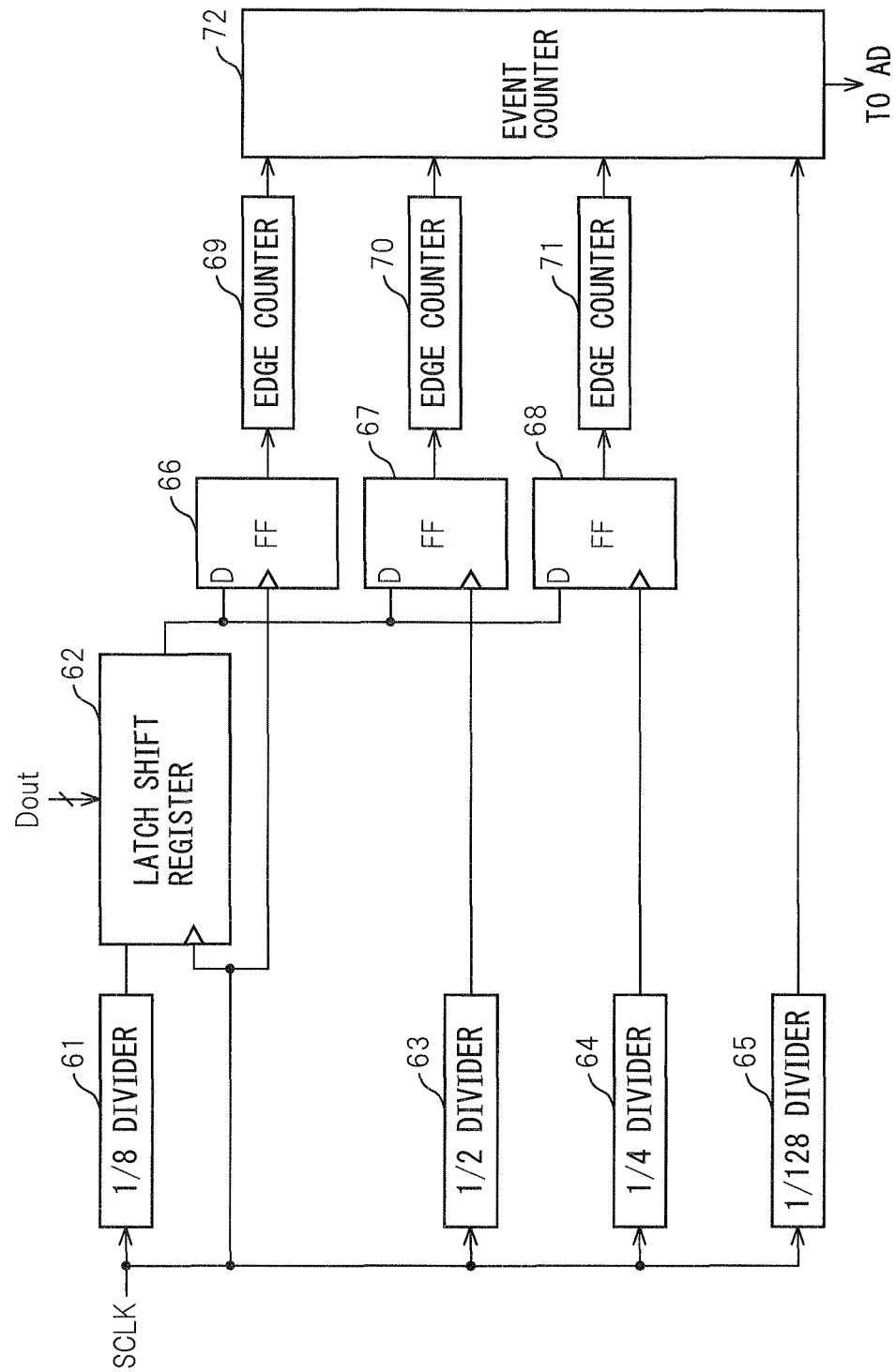
FIG. 10 is a diagram illustrating a circuit configuration of a data pattern analyzer (DPA).

FIG. 10 is a diagram illustrating a circuit configuration of the DPA 41.

As illustrated in FIG. 10, the DPA 41 has a ⅛ divider 61, a shift register 62, a ½ divider 63, a ¼ divider 64, a 1/128 divider 65, flip-flops (FF) 66 to 68, edge counters 69 to 71, and an event counter 72. The ⅛ divider 61, the ½ divider 63, the ¼ divider 64, and the 1/128 divider 65 each divide the sampling clock SCLK in the corresponding division ratio. The shift register 62 latches the output data Dout by a ⅛ frequency divided signal of SCLK, and converts Dout into serial data for one bit each with SCLK and outputs it. Consequently, the signal output from the shift register 62 is a signal resembling the data signal output from the receiving circuit 11.

The FF 66 to 68 latch a signal output from the shift register 62 with SCLK and signals output from the ½ divider 63 and the ¼ divider 64. Consequently, the FF 66 outputs the same signal as the signal output from the shift register 62 delayed by 1 SCLK. The FF 67 latches a signal output from the shift register 62 with a signal, which is SCLK divided into two parts, in other words, the FF 67 latches and outputs a signal once in two periods of SCLK. The FF 68 latches a signal output from the shift register 62 with a signal, which is SCLK divided into four parts, in other words, the FF 68 latches and outputs a signal once in four periods of SCLK.

The edge counters 69 to 71 count the change in outputs of the FF 66 to 68.

The event counter 72 counts the outputs of the edge counters 69 to 71 for each period of the output signal of the 1/128 divider 65.

For example, when the input data is 01010101, the output of the FF 66 is 01010101, the output of the FF 67 is 1111, and the output of the FF 68 is 11. Consequently, the count value of the edge counter 69 is "7" and the count values of the edge counters 70 and 71 are "0". When the input data is 00110011, the output of the FF 66 is 00110011, the output of the FF 67 is 0101, and the output of the FF 68 is 11. Consequently, the count value of the edge counter 69 is "3", the count value of the edge counter 70 is "3", and the count value of the edge counter 71 is "0". Further, when the input data is 00001111, the output of the FF 66 is 00001111, the output of the FF 67 is 0011, and the output of the FF 68 is 01. Consequently, the count value of the edge counter 69 is "1", the count value of the edge counter 70 is "1", and the count value of the edge counter 71 is "1". Consequently, if the event counter 72 counts these outputs of the edge counters 69 to 71, the above-mentioned three patterns having regularity may be identified. Further, in the case of the pattern having regularity in which the same data continues eight or more times, the outputs of the edge counters 69 to 71 are all "0", and therefore, this pattern may also be identified similarly.

When the pattern of input data has no regularity, the outputs of the edge counters 69 to 71 do not have a predetermined relationship, however, from the magnitude of the output value, the frequency of change in data, i.e., the run length may be known.

As described above, the DPA 41 detects the presence/absence of the regularity in the change in data of input data and the run length.

The analysis processing in the DPA 41 is not limited to the example described above if a value corresponding to the run length may be detected.

FIG. 11 is a diagram illustrating another circuit configuration of the DPA 41. The circuit in FIG. 11 has the ⅛ divider 61, the shift register 62, the 1/128 divider 65, the FF 66, an edge detection circuit 75, a counter 76, a latch 77, and an average calculation circuit 78. The ⅛ divider 61, the shift register 62, the 1/128 divider 65, and the FF 66 are the same as those in the circuit in FIG. 10. Consequently, the signal output from the shift register 62 is a signal resembling the data signal output from the receiving circuit 11.

The edge detection circuit 75 detects a change in output of the FF. The counter 76 detects the length between each edge (number of clocks of SCLK) detected by the edge detection circuit 75. The latch 77 latches a value of the counter 76 at each edge. The average calculation circuit 78 calculates the accumulated value of the values of the counter 76 during the period corresponding to 128 periods of SCLK and the number of edges and divides the accumulated value by the number of edges to calculate an average length between each edge. This value corresponds to the run length.

Further, in the circuit in FIG. 11, the number of edges detected by the edge detection circuit 75 in a predetermined period of time (for example, 128 periods of SCLK) indicates the data change rate of input data. This value is a value corresponding to the run length and it is also possible to determine the aliasing state using the data change rate of input data instead of the run length.

Next, processing in the aliasing detector (AD) 42 is explained.

Figure 12A:
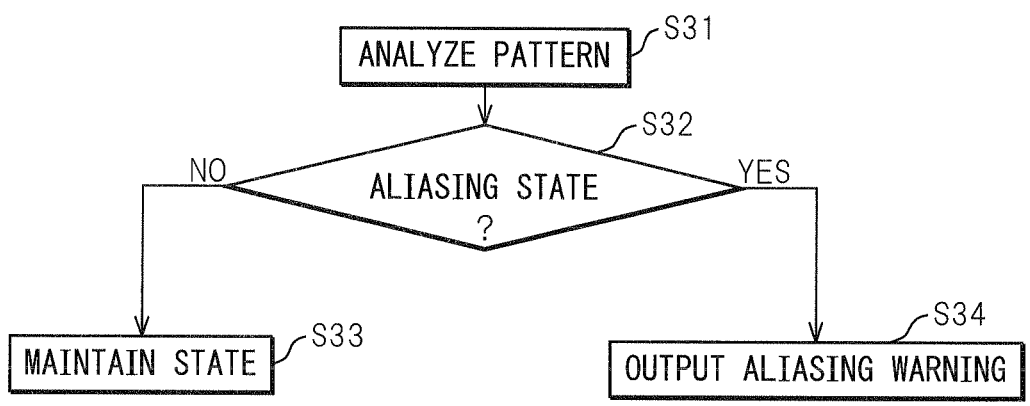
FIG. 12A and FIG. 12B are flowcharts illustrating a processing example in an aliasing detector (AD).
Figure 12B:
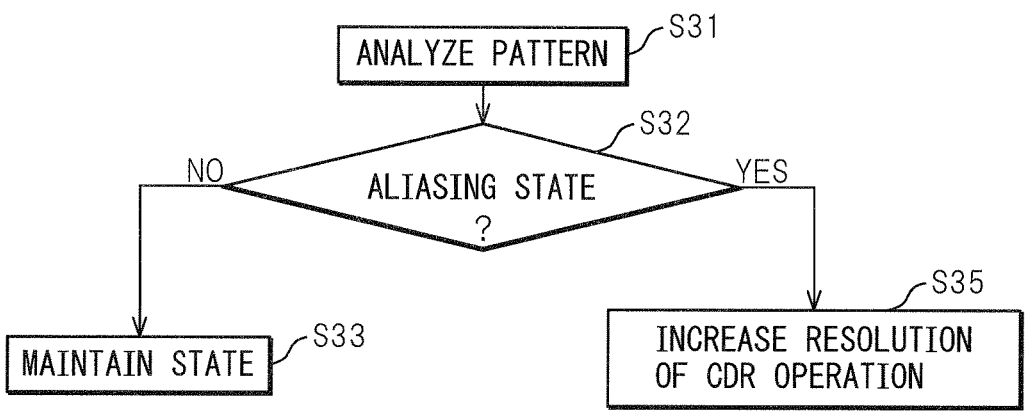

FIG. 12A and FIG. 12B are flowcharts illustrating an example of processing in the AD 42.

In the example illustrated in FIG. 12A, a pattern analysis is carried out in step S31. This processing corresponds, for example, to that in S21 to S23 in FIG. 8.

In step S32, whether the state is the aliasing state is determined and when the state is determined to be the non-aliasing state, the procedure proceeds to step S33 and when the state is determined to be the aliasing state, to step S34. Step S32 corresponds to step S24.

In step S33, the AD 42 determines that the CDR operation is in the locked state, and therefore, the PI code at this point of time is maintained.

In step S34, the AD 42 sets a flag and outputs warning to the effect that there is a possibility that the state is the aliasing state.

The processing when the state is determined to be the aliasing state includes other various kinds of processing. In the example in FIG. 12B, when the state is determined to be the aliasing state in step S32, the resolution of the CDR operation is increased in step S35. This processing is described later.

Figure 13:
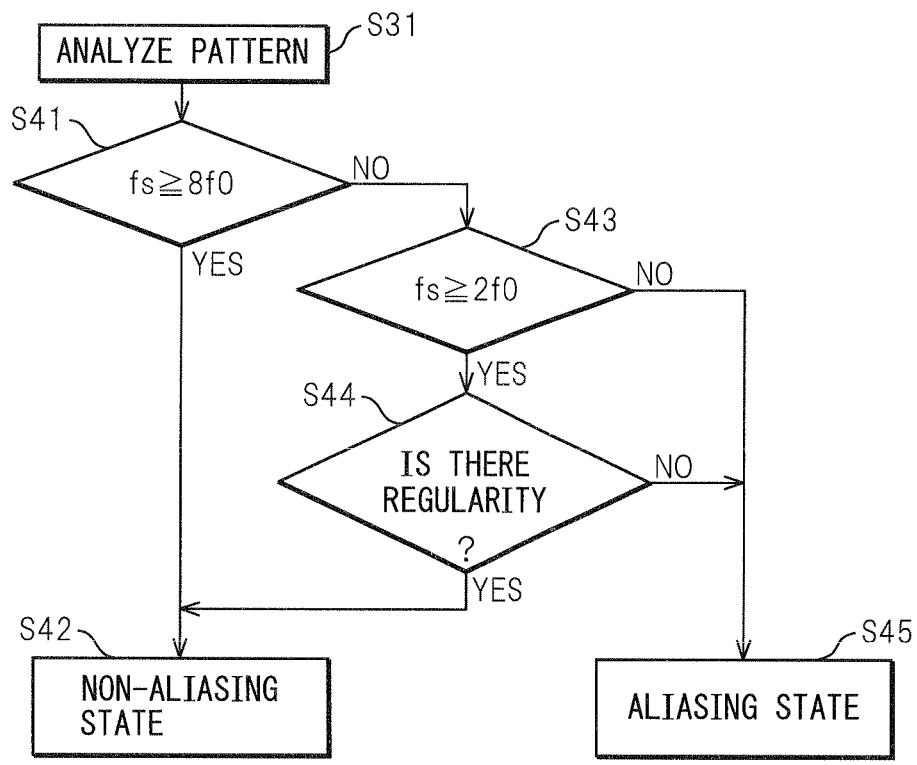
FIG. 13 is a flowchart illustrating an example of the determination processing of the aliasing detector (AD) to determine whether the state is the aliasing state based on the pattern analysis result.

FIG. 13 is a flowchart illustrating an example of determination processing in which the AD 42 determines whether the state is the aliasing state based on the analysis result.

In step S41, after carrying out the pattern analysis in step S31, whether the sampling frequency fs is greater than 8f0, eight times the jitter frequency f0, is determined and when greater, the procedure proceeds to step S42 and when not, to step S43.

In step S42, the state is determined to be the non-aliasing state.

In step S43, whether the sampling frequency fs is greater than 2f0 is determined and when greater, the procedure proceeds to step S44 and when not, to step S45.

In step S44, whether the pattern of input data has the above-described regularity is determined and when it has the regularity, the procedure proceeds to step S42 and when not, to step S45.

In step S45, the state is determined to be the aliasing state.

As described above, in S35 in FIG. 12B, processing to increase the resolution of the CDR operation is performed and this processing is performed by increasing the resolution of the phase interpolator (PI) 33. Due to this, the same effect as that when the sampling frequency is increased may be obtained.

FIG. 14A to FIG. 14D are diagrams explaining the processing to increase the resolution of the CDR operation.

As described above, the phase interpolator (PI) 33 generates eight signals the phases of which are shifted by 0°, 45°, 90°, 135°, 180°, 225°, 270°, and 315° with respect to RCLK. Normally, only four signals the phases of which are shifted by 0°, 90°, 180°, and 270° with respect to RCLK are selected. The reason for this is to perform feedback in quick response to the change in phase of the clock in input data.

Figure 14B:
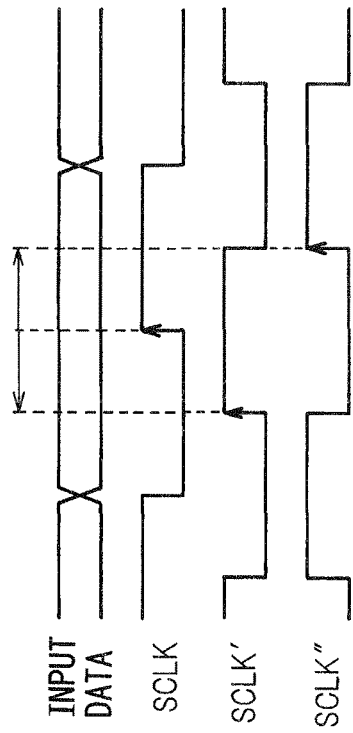
FIG. 14A to FIG. 14D are diagrams explaining processing to improve resolution in the CDR operation.
Figure 14D:
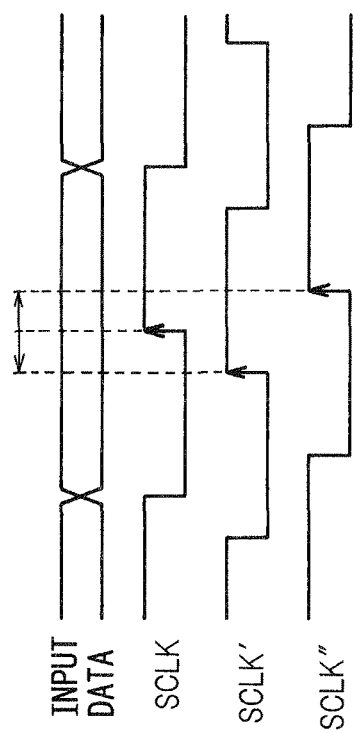
Figure 14A:
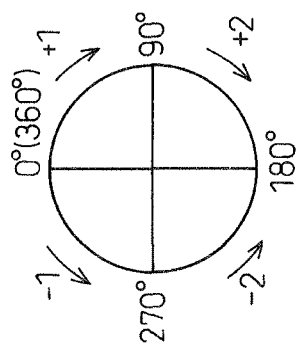

FIG. 14A illustrates a case where the PI 33 selects four signals the phases of which are shifted by 0°, 90°, 180°, and 270° with respect to RCLK as SCLK and FIG. 14B illustrates an adjustment range of SCLK in such a case. The rising edge of SCLK is in the ideal phase if the edge is in the middle of the change edge of input data and the four signals the phases of which are shifted by 90° from one another are locked in phase in a range of ±90° with respect to the center.

Figure 14C:
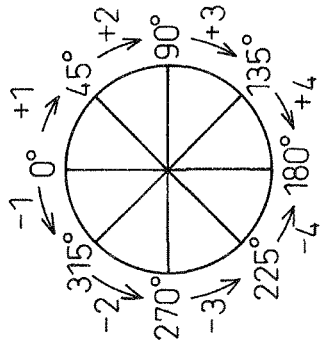

In contrast to this, FIG. 14C illustrates a case where the PI 33 selects eight signals the phases of which are shifted by 0°, 45°, 90°, 135°, 180°, 225°, 270°, and 315° with respect to RCLK as SCLK and FIG. 14D is a diagram illustrating the adjustment range of SCLK in such a case. The eight signals the phases of which are shifted by 45° from one another are locked in phase at ±45° with respect to the center. Consequently, it is possible to perform feedback more precisely in the CDR operation.

Figure 15A:
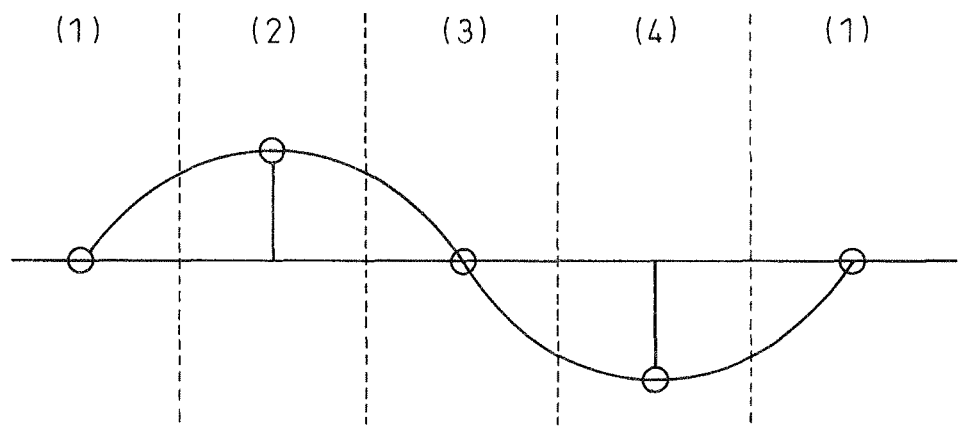
FIG. 15A to FIG. 15B are diagrams illustrating sampling when the amount of jitter changes in the form of a sinusoidal wave.
Figure 15B:
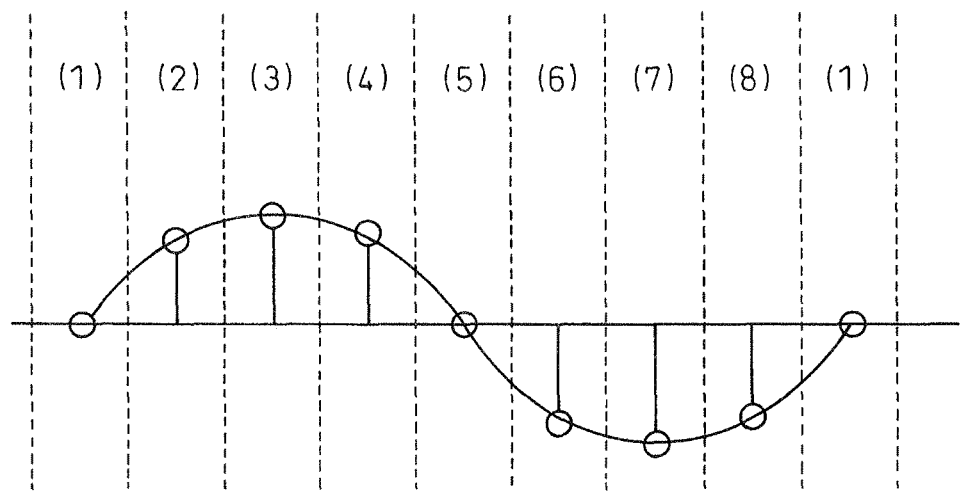

FIG. 15A and FIG. 15B illustrate sampling when the amount of jitter changes in the form of a sinusoidal wave, wherein FIG. 15A illustrates a case where four signals the phases of which are shifted by 90° from one another with respect to RACL are selected as SCLK and FIG. 15B illustrates a case where eight signals the phases of which are shifted by 45° from one another are selected.

It is also possible to enable the PI 33 to select 16 signals the phases of which are shifted by 22.5° from one another by further increasing the resolution in the CDR operation.

When the state is determined to be the aliasing state in the state where the resolution of the PI 33 is increased, in other words, in the state where the sampling frequency is increased, a signal is output to the effect that the state is the aliasing state where the clock is not synchronized.

There may also be various modified examples other than the embodiments described above. For example, a configuration of a SerDes circuit having a basic CDR function, except for the aliasing detection block 40 in FIG. 6, and having the publicly-known CDR function may be applied.

As described above, even for a clock data recovery circuit in a locked state, the possibility of an erroneous operation may be evaluated from a data pattern of input data, and therefore, reliability may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A clock data recovery circuit comprising:
   a receiving circuit that takes in input data based on a sampling clock;
   a demultiplexer that converts serial data output from the receiving circuit into parallel data;
   a clock/data recovery part that detects phase information from the parallel data output from the demultiplexer and generates the sampling clock by adjusting the phase of a reference clock based on the phase information;
   a data pattern analyzer that carries out a frequency analysis of the parallel data output from the demultiplexer; and
   an aliasing detector that detects a clock recovery state based on the analysis result of the frequency of the parallel data.

2. The clock data recovery circuit according to claim 1, wherein
   the data pattern analyzer detects a run length in the parallel data.

3. The clock data recovery circuit according to claim 1, wherein
   the data pattern analyzer detects a data change rate in the parallel data.

4. The clock data recovery circuit according to claim 1, wherein
   the aliasing detector determines whether the operating state is a non-aliasing state or an aliasing state based on the clock recovery state detected and outputs the determined operating state.

5. The clock data recovery circuit according to claim 2, wherein
   the aliasing detector determines whether the operating state is a non-aliasing state or an aliasing state based on the clock recovery state detected and outputs the determined operating state.

6. The clock data recovery circuit according to claim 3, wherein
   the aliasing detector determines whether the operating state is a non-aliasing state or an aliasing state based on the clock recovery state detected and outputs the determined operating state.

7. The clock data recovery circuit according to claim 1, wherein
   the clock/data recovery part changes the followability in the phase adjustment of the reference clock to generate the sampling clock based on the clock recovery state detected by the aliasing detector.

8. The clock data recovery circuit according to claim 2, wherein
   the clock/data recovery part changes the followability in the phase adjustment of the reference clock to generate the sampling clock based on the clock recovery state detected by the aliasing detector.

9. The clock data recovery circuit according to claim 3, wherein
   the clock/data recovery part changes the followability in the phase adjustment of the reference clock to generate the sampling clock based on the clock recovery state detected by the aliasing detector.

10. The clock data recovery circuit according to claim 4, wherein
    the clock/data recovery part changes the followability in the phase adjustment of the reference clock to generate the sampling clock based on the clock recovery state detected by the aliasing detector.

11. The clock data recovery circuit according to claim 7, wherein
    the change of the followability in the phase adjustment of the reference clock is a change of resolution of adjustment of the phase.

12. The clock data recovery circuit according to claim 8, wherein
    the change of the followability in the phase adjustment of the reference clock is a change of resolution of adjustment of the phase.

13. The clock data recovery circuit according to claim 9, wherein the change of the followability in the phase adjustment of the reference clock is a change of resolution of adjustment of the phase.

14. The clock data recovery circuit according to claim 10, wherein
the change of the followability in the phase adjustment of the reference clock is a change of resolution of adjustment of the phase.

15. The clock data recovery circuit according to claim 7, wherein
the change of the followability in the phase adjustment of the reference clock is a change of gain of adjustment of the phase.

16. The clock data recovery circuit according to claim 8, wherein
the change of the followability in the phase adjustment of the reference clock is a change of gain of adjustment of the phase.

17. The clock data recovery circuit according to claim 9, wherein
the change of the followability in the phase adjustment of the reference clock is a change of gain of adjustment of the phase.

18. The clock data recovery circuit according to claim 10, wherein
the change of the followability in the phase adjustment of the reference clock is a change of gain of adjustment of the phase.

19. A clock data recovery method comprising:
taking in input data based on a sampling clock and outputting serial data;
converting the serial data into parallel data;
detecting phase information from the parallel data and generating the sampling clock by adjusting the phase of a reference clock based on the phase information;
carrying out an analysis of the frequency of the parallel data; and
determining whether the clock recovery is in an aliasing state based on the analysis result of the frequency of the parallel data.

* * * * *